No. 750,457. PATENTED JAN. 26, 1904.
F. E. HAYCOCK & J. McDERMOTT.
CREMATORY.
APPLICATION FILED APR. 18, 1903.
NO MODEL. 6 SHEETS—SHEET 1.

WITNESSES

INVENTORS
Frank E. Haycock
Joseph McDermott
By Paul & Paul
Their attorneys

No. 750,457. PATENTED JAN. 26, 1904.
F. E. HAYCOCK & J. McDERMOTT.
CREMATORY.
APPLICATION FILED APR. 18, 1903.
NO MODEL. 6 SHEETS—SHEET 3.

WITNESSES

INVENTORS
Frank E. Haycock
Joseph McDermott
By Paul & Paul
Their Attorneys

No. 750,457. PATENTED JAN. 26, 1904.
F. E. HAYCOCK & J. McDERMOTT.
CREMATORY.
APPLICATION FILED APR. 18, 1903.
NO MODEL. 6 SHEETS—SHEET 5.

WITNESSES
INVENTORS
Frank E. Haycock
Joseph McDermott
By Paul & Paul
Their Attorneys No. 750,457. Patented January 26, 1904.

UNITED STATES PATENT OFFICE.

FRANK E. HAYCOCK AND JOSEPH McDERMOTT, OF MINNEAPOLIS, MINNESOTA.

CREMATORY.

SPECIFICATION forming part of Letters Patent No. 750,457, dated January 26, 1904.

Application filed April 18, 1903. Serial No. 153,161. (No model.)

*To all whom it may concern:*

Be it known that we, FRANK E. HAYCOCK and JOSEPH McDERMOTT, of Minneapolis, county of Hennepin, State of Minnesota, have invented certain new and useful Improvements in Crematories, of which the following is a specification.

Our invention relates to crematories designed particularly for destroying garbage; and the object of our invention is to provide a garbage and sewage crematory in which all noxious gases will be consumed and foul odors destroyed, thereby rendering the apparatus suitable for use in connection with private residences, hotels, sanatariums, hospitals, and other public or semipublic institutions as well as in municipalities.

A further object is to provide a crematory apparatus that will be economical to operate, comparatively simple in construction, of very large capacity, and one in which almost perfect combustion can be obtained.

A still further object is to provide a crematory apparatus in which the heat from the burning offal is utilized to generate steam for commercial purposes.

The invention consists generally in providing means for reducing all solid garbage matter to fragments or particles of substantially the same size before delivery to the fire, to the end that combustion will be complete and uniform.

Further, the invention consists in means for extracting and separating all liquids from the solid matter before delivery to the fire, to the end that the drying and burning operation will be more rapid and complete.

Further, the invention consists in providing means for consuming all noxious vapors and gases generated by the burning garbage and hot liquids before the products of combustion reach the stack.

Further, the invention consists in an improved form of grate for the drying-chamber.

Further, the invention consists in providing a superheating-chamber and an improved water-grate therefor.

Further, the invention consists in various constructions and combinations, all as hereinafter described, and particularly pointed out in the claims.

In the accompanying drawings, forming part of this specification, Fig. 4 is a section on the line $m\ m$ of Fig. 2. Fig. 5 is a section on the line $n\ n$ of Fig. 2.

In the drawings, 2 represents a suitable hopper having a discharge-opening 3, on opposite sides of which we provide concaves 4, having downwardly-curved teeth 5. A semicylindrical member 6 is mounted in bearings between said concaves and provided on its periphery with a series of teeth 7, that are also downwardly curved and coöperate with the teeth 5 to engage the solid matter that is delivered to the hopper and tear the same apart, reducing it to particles of practically the same size that can be successfully handled by the crushing and pressing mechanism and facilitate the burning operation. The member 6 is arranged to oscillate in its bearings, having a limited movement back and forth, and the teeth of the member and concave being downwardly curved will clear themselves of the material fed thereto. As the member moves in one direction its teeth will disengage the material from the teeth of the concave on that side and advance the material toward the discharge side of the member. On the return stroke of the member the stationary or concave teeth will prevent the material from being carried up by the teeth of the member. The rapid oscillation of the member will thoroughly reduce the material and feed the same in a continuous stream into a receiving-funnel 8 beneath. Any suitable mechanism may be provided for oscillating the member 6; but we prefer to provide a disk 9, eccentrically connected with the member 6 by a rod 10, and near said disk we provide a friction-drive 11, driven from a suitable source of power and supported on a lever 12, that is pivoted on a timber 13. A series of timbers 14 extend across the top of the hopper, and on these timbers the wagons containing the material to be destroyed are driven. For convenience we prefer to provide guide-strips 15 upon said timbers to direct the wheels of the wagons as they are driven on to the hopper. We have shown a hopper adapted to receive two wagons side by side, or one wagon may be driven on the middle of the hopper, if preferred. Between the timbers 14 are hinged gates or doors 16, that are adapted to be raised to allow the loads to be dumped into the hopper. To prevent any one from becoming injured while delivering material to the apparatus, we prefer to provide means for locking the gates 16 to prevent access to the hopper while the member 6 is in operation. We therefore provide a rod 17, slidable in bearings in the timbers 14 and connected at one end to the lever 12. Upon said rod we provide bolts 18, and in the timbers 19, upon which the gates rest when closed, we provide sockets 20 to receive pins 21 and springs 22. Pins 23, having slots 24, are provided in said gates. The weight of the gates when they are closed will compress the springs 22 and allow the pins 23 to enter the sockets 20 a sufficient distance to bring the slots 24 opposite the ends of the bolts 18, and when the lever is thrown to set the member 6 in operation the said bolts will enter the slots 24 and lock the gates, preventing access to the hopper until the lever 12 has been thrown in an opposite direction and the member is at rest. As soon as the bolts have been withdrawn from the pins 23 and the gates lifted the springs will raise the pins 21 to a point opposite the ends of the bolts and prevent movement of the rod 17 and the lever 12 until the gates have again been closed. It will therefore be impossible for any one to feed material into the hopper while the apparatus is in operation.

Figures 7, 8, 9, 10:
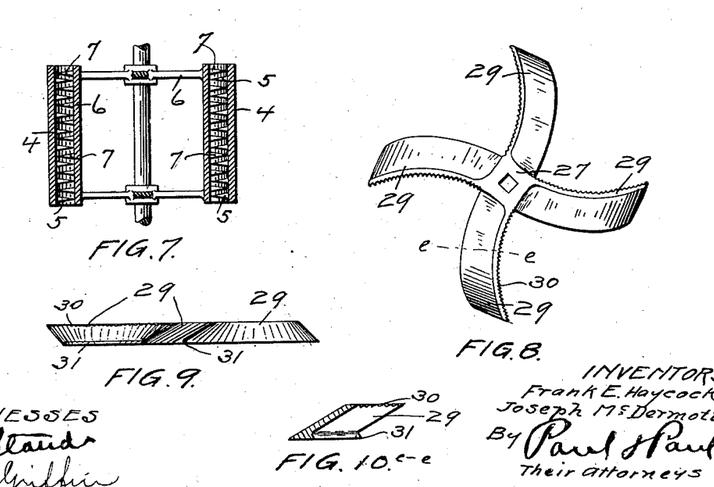
Fig. 7 is a detail of the oscillating mechanism for tearing the solid matter apart and reducing it to a suitable degree of fineness for the grinding operation. Fig. $7^a$ is a partial plan view in section on the line $w\ w$ of Fig. 1.
Fig. 8 is a plan view of the revolving, grinding, and pressing device.
Fig. 9 is an edge view of the same.
Fig. 10 is a section on the line $e\ e$ of Fig. 8.
Figure 14:
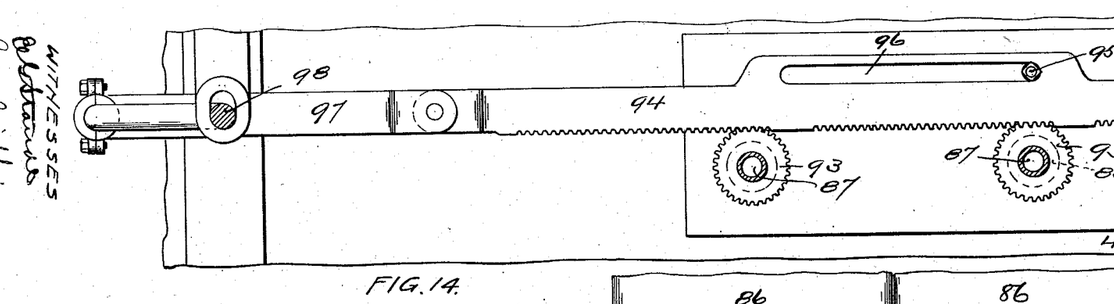
Fig. 14 is a side view of the water-grate-operating mechanism.
Figures 15, 16, 17, 18, 19:
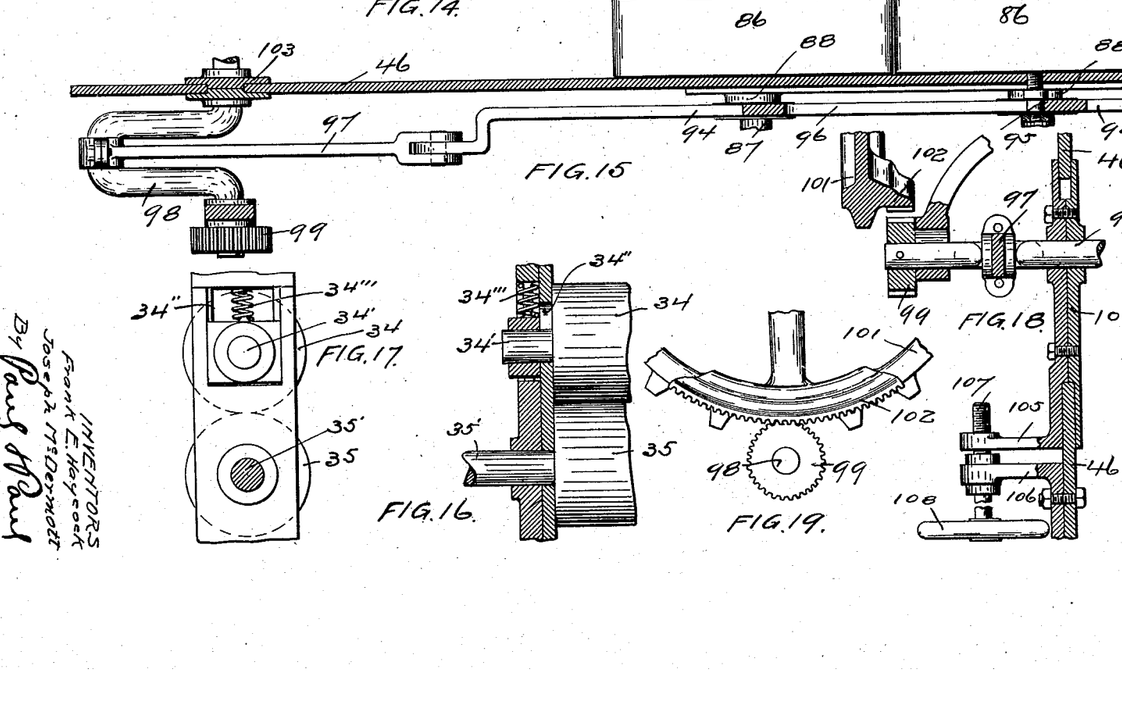
Fig. 15 is a plan view, partially in section, of the same.
Figs. 16 and 17 are details of the bearings of the feed-rolls.
Fig. 18 is a detail in section of the mechanism for throwing the water-grate-operating shaft into and out of mesh with its operating-gear.
Fig. 19 is a detail showing the pinion on the end of the water-grate-operating shaft in mesh with the teeth of its driving-gear.

Within the funnel 8, below the hopper, is a horizontal floor 25, provided with a series of perforations 26, and upon said floor is a revolving crushing and pressing device 27, mounted on a shaft 28 and having a series of curved radiating arms 29, that are adapted to sweep over the upper surface of the floor 25. These arms, as shown in Figs. 8, 9, and 10, are obliquely arranged with respect to the plane of the floor 25 and have on their upper side a series of teeth 30 and on their lower side a cutting edge 31. These teeth and cutting edges sweeping over the floor 25 will crush and squeeze the solid matter discharged from the hopper, extracting a portion of the liquid therefrom, which will flow down through the perforations 26 upon an inclined plate 32, having a series of perforations 33. The discharge edge of the plate 32 is near the pressure and feed rolls 34 and 35, provided in an opening 36 in the wall 37 of a drying-chamber 38, whereto the comminuted material is delivered from between said rolls.

We have shown smooth-surfaced rolls; but they may be corrugated, if preferred. The shaft 35' of the lower roll is mounted in fixed bearings, while the bearings of the shaft 34' of the upper roll are vertically movable in slots 34'', being yieldingly held against vertical movement by springs 34'''. The revolving device 27 will effect a preliminary separation of the liquids from the solids and at the same time reduce the material to a greater degree of fineness, so that when it is delivered to the feed-rolls and drying-chamber the particles will be nearly uniform in size and a comparatively complete combustion will take place. The feed-rolls will complete the operation of separating the liquids from the solids and will perform their functions so thoroughly that practically all the moisture will be removed from the solid material by its passage through the rolls. As the liquid is squeezed out of the solid material it will fall down over the surface of the roll 35 into the filtering-chamber beneath and mingle with the liquid therein that has been extracted by the action of the crushing device 27.

An imperforate plate 39 is provided beneath the plate 32, and a screen 40 is interposed between said plates to collect and drain the liquid from the fine material that falls through the perforations 33 and allow it to fall upon the plate 39, while the fine material is directed into the feed-rolls. The lower end of the shaft 28 is supported in bearings in the bracket 41, arranged upon timbers 42, and said shaft has a beveled gear 43, that meshes with a similar gear 44 on a shaft 45, that projects through the wall 46, inclosing the apparatus, and is provided with a pulley 47. Beneath the timbers 42 is a filtering-chamber 48, in the bottom of which is a layer 49, of suitable filtering material, upon a perforated floor 50, below which is a hopper 51. This hopper extends across the apparatus and is provided with a series of discharge-nipples 51', that are connected to horizontal water-evaporating pipes 52, arranged parallel and extending through the incinerating-chamber over the fire-box grate, as hereinafter described. These pipes are connected to a large pipe 54, that is arranged outside the wall of the crematory for the reception of vapor generated in the evaporating-pipes 52. Valves 53 are provided in each pipe 52, by means of which the flow of water therethrough can be cut off in case one of the pipes should become burned out. A pipe 55 leads from the pipe 54 to a condenser 56, arranged outside the apparatus and wherein the steam formed in the pipes as the water flows over the fire-box is condensed. A pipe 91 leads to a pipe 54', on the opposite side of the apparatus, from which a pipe 55' communicates with a condenser 56'. A pipe 58 leads from the bottom of the condenser 56' to a boiler 59, wherein steam is generated for commercial purposes. The water that accumulates in the chamber 48 will slowly filter down through the bottom thereof and flow through the evaporating-pipes 52. The steam accumulating in the pipe 54 from the heated water in the evaporating-tubes will ascend through the pipe 55 and pass into the condenser 56, and becoming condensed will flow in a liquid form through the pipe 91 to the pipe 54' at the opposite side of the apparatus. The pipe 91 communicates, as will hereinafter appear, with a system of water-tubes arranged over the fire-box and wherein the water will become again heated and the vapor therefrom will be conducted from the pipe 54' up through the pipe 55' to the condenser 56'. The liquid after being passed through the filter and the evaporating-pipes and converted into steam therein, then condensed and conducted to the water-grate and again vaporized and delivered to the second condenser, will be sufficiently purified to be suitable for use in generating steam for commercial purposes and will be conducted from the second condenser through the pipe 58, as described, directly to a boiler.

The hopper 51 is provided with a discharge-pipe 65 on one side, through which the water will flow when it rises above a certain predetermined height and upon being discharged from said pipe will drop into a chamber 66 beneath, that is separated by a partition 67 from a similar chamber 68, which in turn is separated from a chamber 69 by a partition 70, that is of less height than the partition 67. It follows, therefore, that as the water flows down through the pipe 65 into the chamber 66 and rises above the partition 67 it will flow thereover into the chamber 68 and from thence over the partition 70 to the chamber 69. A discharge-pipe 71, having a valve 72, is provided in the bottom of the chamber 69, and a similar pipe 73, also having a regulating-valve, leads from the chamber 48. If the liquid accumulates in the chamber 48 above a certain predetermined height, the operator can relieve it by means of the overflow-pipe 73, and should all the chambers below the hopper 51 become filled the surplus may be discharged through the pipe 71. If desired, the pipes 71 and 73 may be connected and the liquid pumped back into the chamber 48 to be filtered a second time. After leaving the liquid-extracting rolls the solid material passes into a part of the crematory apparatus which we prefer to designate as the "incinerating-chamber." This chamber is made up of several apartments—an upper drying-chamber, where the comminuted material is thoroughly dried and separated, a lower superheating-chamber, wherein the material is subjected to a still higher degree of heat than that of the drying-chamber, and finally a fire-box having a grate whereon the material falls from the superheating-chamber and is thoroughly destroyed. These chambers we will hereinafter describe in detail.

We prefer to provide a stiff steel brush 74 near the feed-rolls 34 and 35 to receive the material therefrom and distribute it over the floor of the drying-chamber 38. This chamber is inclosed by a suitable wall 75 and has a bottom formed of a series of transverse grate-bars 76, arranged at intervals to form a series of spaces 77, through which the material falls into a superheating-chamber 78 beneath. Bars 79 are provided at each end of the grate-bars and slidable thereon, and each bar 79 has a slot 80 to receive a pin 81 in the wall of the chamber. These pins serve to limit the movement of the operating-bars. The bars 79 are connected by cross-bars 82, that are V-shaped in cross-section with the apex uppermost and their lower edges arranged to slide on the bars 76. The ends of the sliding bars 79 are connected by pitmen-rods 83 with a multiple-crank shaft 84, the revolution of which will reciprocate the bars 79 and move the V-shaped cross-bars 82 back and forth over the grate-bars 76, scraping the material therefrom and discharging it into the spaces 77 between the said grate-bars. Plates 85, secured to the walls of the chamber, prevent the dried material from accumulating on the V-shaped cross-bars at the ends of the grate. The crushed and reduced material delivered to the feed-rolls will be caught up by the revolving brush and strewn over the floor of the drying-chamber, where it will be kept in motion by the action of the reciprocating grate and subjected to a preliminary drying process. It is then discharged into the superheating-chamber beneath. This chamber is provided with a floor consisting of a series of flattened evaporating tubes or pipes 86, that have hollow gudgeons 87 at each end, that are mounted in bearings 88 and connected by couplings 89 with pipes 90, leading into pipes 91 and 92 on opposite sides of the apparatus. The pipes 91 and 92 are also connected, respectively, with the condenser 56 and the pipe 54' and with the condenser 56'. The couplings form steam-tight joints and at the same time allow the water-tubes to revolve freely. This connection of the water-tubes with the condenser-pipe system insures the circulation of fluid through the tubes and prevents their burning out, and at the same time the flattened surfaces of the tubes presenting a large area of heating-surface to the fire-box increase the generation of steam in the pipes and in addition radiate a considerable quantity of heat to assist in raising the temperature of the superheating-chamber. The hollow gudgeons 87 are provided with pinions 93, that are engaged by rack-bars 94, supported by pins 95, mounted in the walls of the chamber and projecting through slots 96 in said bars to limit the reciprocation of the same. Pitmen 97 connect the said bars with a multiple-crank shaft 98, provided with a pinion 99. A shaft 100 is mounted in the wall of the apparatus and provided with a sprocket-wheel 101, having on one side a mutilated gear 102. Bearing-boxes 103 and 104 for said crank-shafts are provided in the walls of the apparatus and are vertically adjustable therein by means of brackets 105 and 106, provided, respectively, on said boxes and the fixed portions of said walls and having threaded holes to receive threaded shanks 107, having hand-wheels 108. Revolution of said hand-wheels will separate the brackets 105 and 106 of each pair or draw them together and raise or lower the boxes 103 and 104 to move the crank-shafts 84 and 98 toward or from the sprocket-wheel 101 When the pinions 99 on said shafts are moved into position to engage the teeth of the gear 102, the said shafts will be alternately revolved. The grate-bars will be reciprocated for a short period during the revolution of said sprocket and will then remain stationary while the water-tubes are operated for a similar period. This alternate movement of the grate and water-tubes will be continued as long as the apparatus is in use. The sprocket 101 is connected by a chain 109 with the shaft 35' of the lower feed-roll, on which we provide a driven pulley 110, by means of which the crushing and reducing apparatus is operated from a suitable source of power. Pulleys 111 and 112 are provided on said shafts 35' and connected by belts 113 and 114 with the pulley 47 and with the pulley 115 on the brush-shaft. At the opposite ends of the said rolls their shafts are provided with gears 116, that are in mesh and through which the upper roll is driven from the lower.

Figure 2:
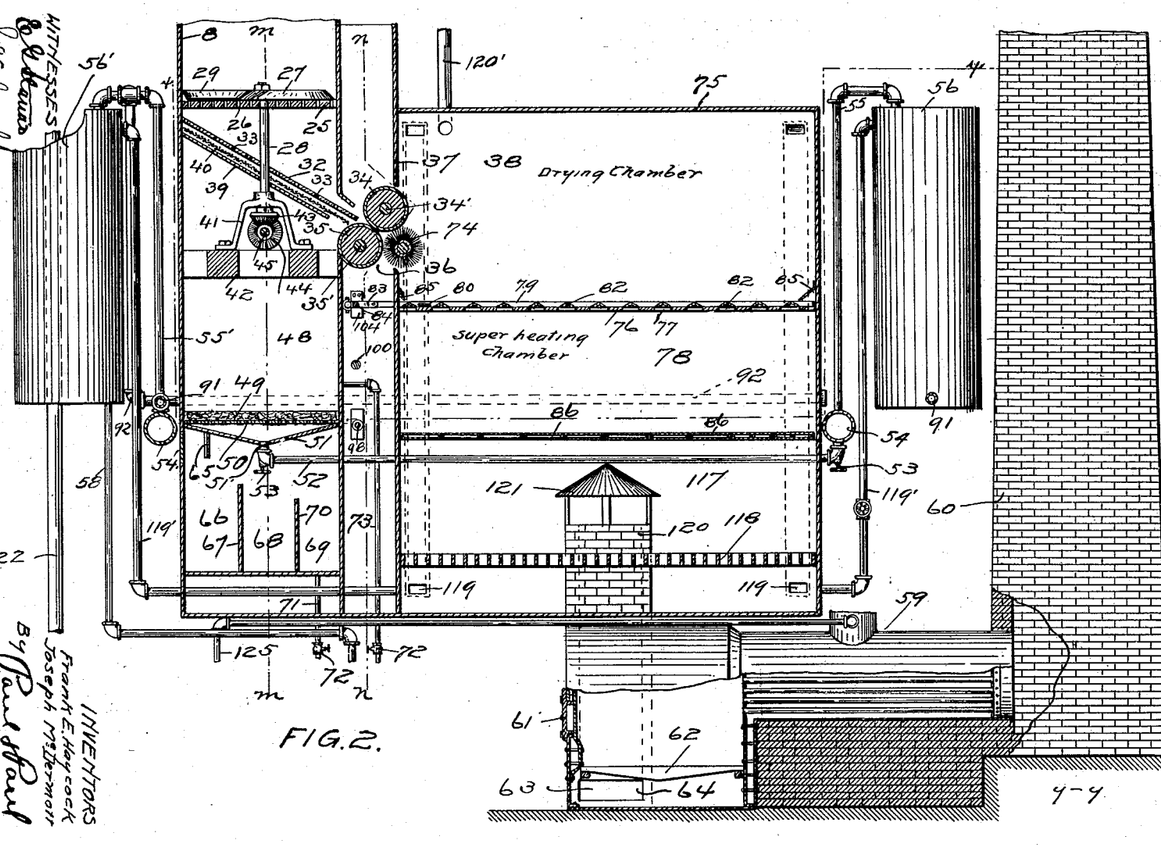
Fig. 2 is a section on the line $y\ y$ of Fig. 3.
Figures 3, 20, 21, 22:
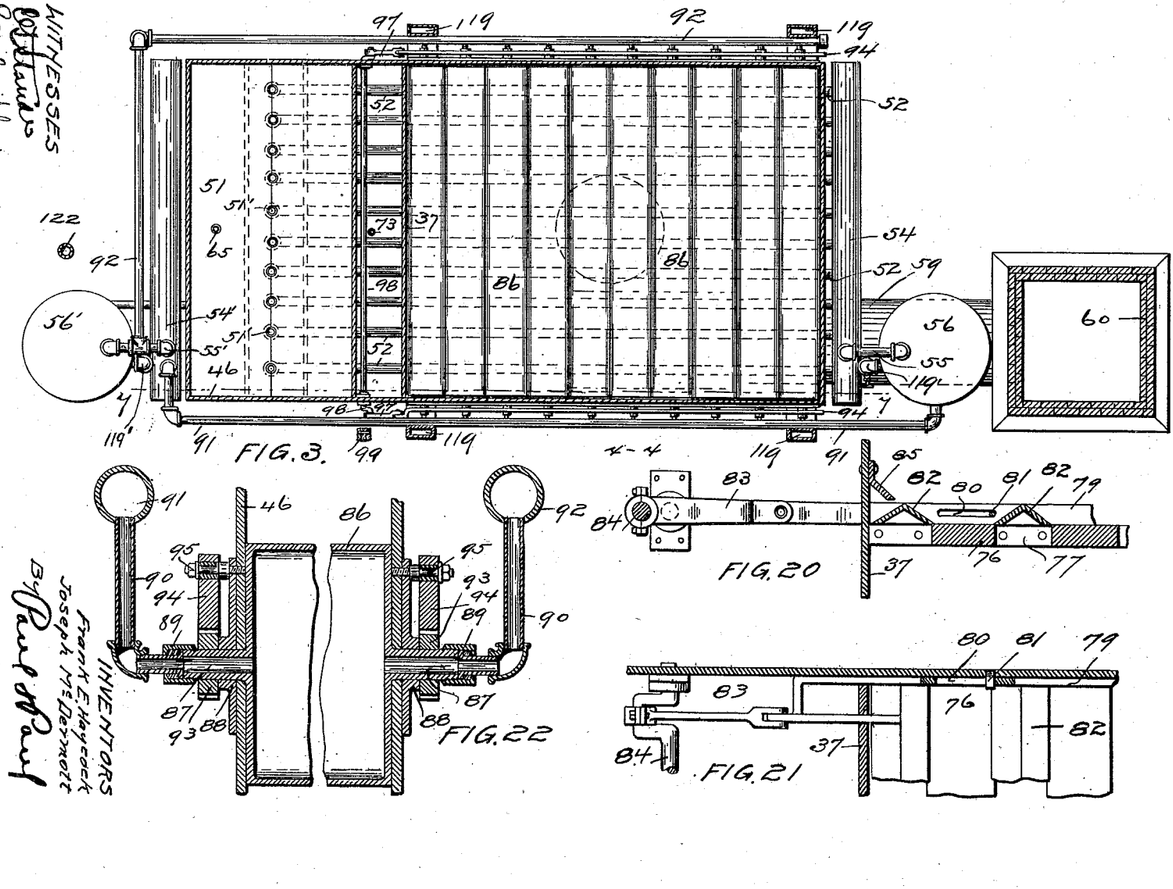
Fig. 3 is a section on the line $x\ x$ of Fig. 2.
Fig. 20 is a detail of the sliding grate in the bottom of the drying-chamber.
Fig. 21 is a plan view of the same.
Fig. 22 is a longitudinal section of one of the hollow pipes of the water-grate, showing the manner of supporting the same and conducting the water thereto.
Figures 4, 5, 7A:
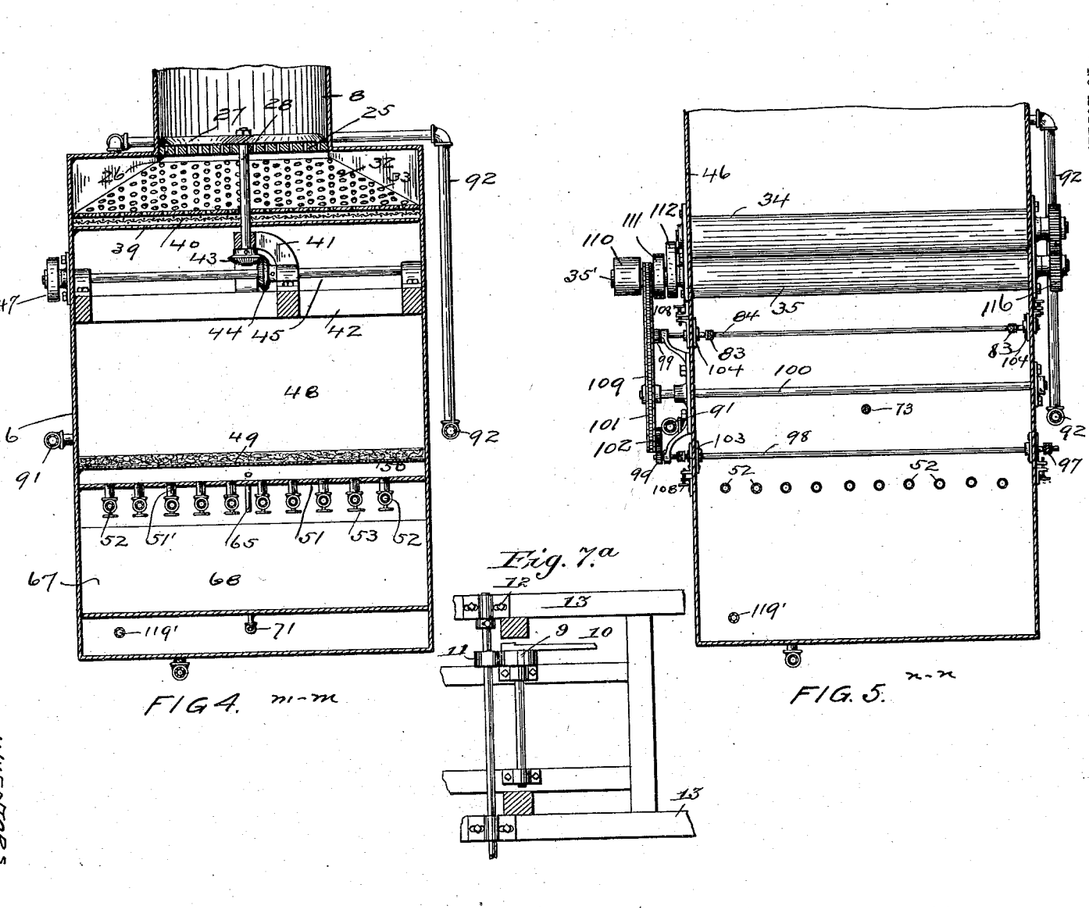
Figure 6:
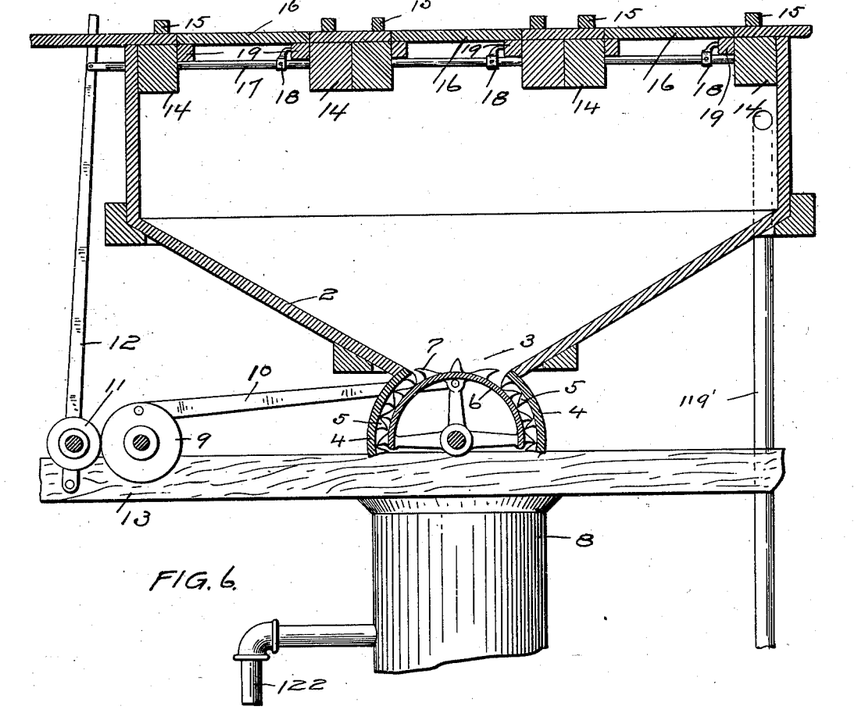
Fig. 6 is a vertical section of the feed-hopper and the apparatus for locking the same to prevent access thereto when the crematory is in operation.

As shown in Fig. 2, the water-tubes when in their normal position present a substantially flat surface for the bottom of the superheating-chamber, forming a continuous unbroken floor thereover. When, however, the said tubes are swung on their pivots, spaces will be formed between them, through which the now thoroughly dried material will drop into a fire-box 117 beneath. This fire box or chamber is provided with a grate 118, fuel-door 118', and flues 119, leading from the bottom of said box beneath said grate, outside of the apparatus, to the upper part of the drying-chamber through the wall thereof. The flues conduct the gases generated by the mixing, drying, and burning of the material in the chambers above the fire-box down to the grate, where they are all consumed before being discharged into the stack. Pipes 119' lead from the condensers to the flues 119 and conduct thereto all noxious gases and vapors that may rise from the hot liquid, and also exhaust all excessive steam in the condensers under the fire-grate to be consumed. We also provide a flue 120, that communicates with the passage 64 and extends through the grate up to a point near the middle of the fire-box. On top of this flue we provide a cap 121. A fire being started on the grate 118 and the dried and ground material discharged upon the same, the gases that ascend into the drying and superheating chambers will be conducted back through the flues 119, and passing through and over the fire and into the flue 120 and from thence up through the grate 62 and the fire thereon will be entirely consumed before entering the stack 60. The products of combustion, therefore, discharged from the stack will be freed from all noxious gases, and an apparatus of this kind may be located in the residence section of a city or near hospitals, hotels, or similar institutions without being in any way offensive or injurious to the health of the people of that locality.

A pipe 120' connects the hopper with the incinerating-chamber to allow the gas that may accumulate in the hopper, should the material remain therein for any length of time, to pass into the incinerating-chamber and through the fire-box and grate, where it will be consumed before reaching the stack.

Figures 1, 11, 12, 13:
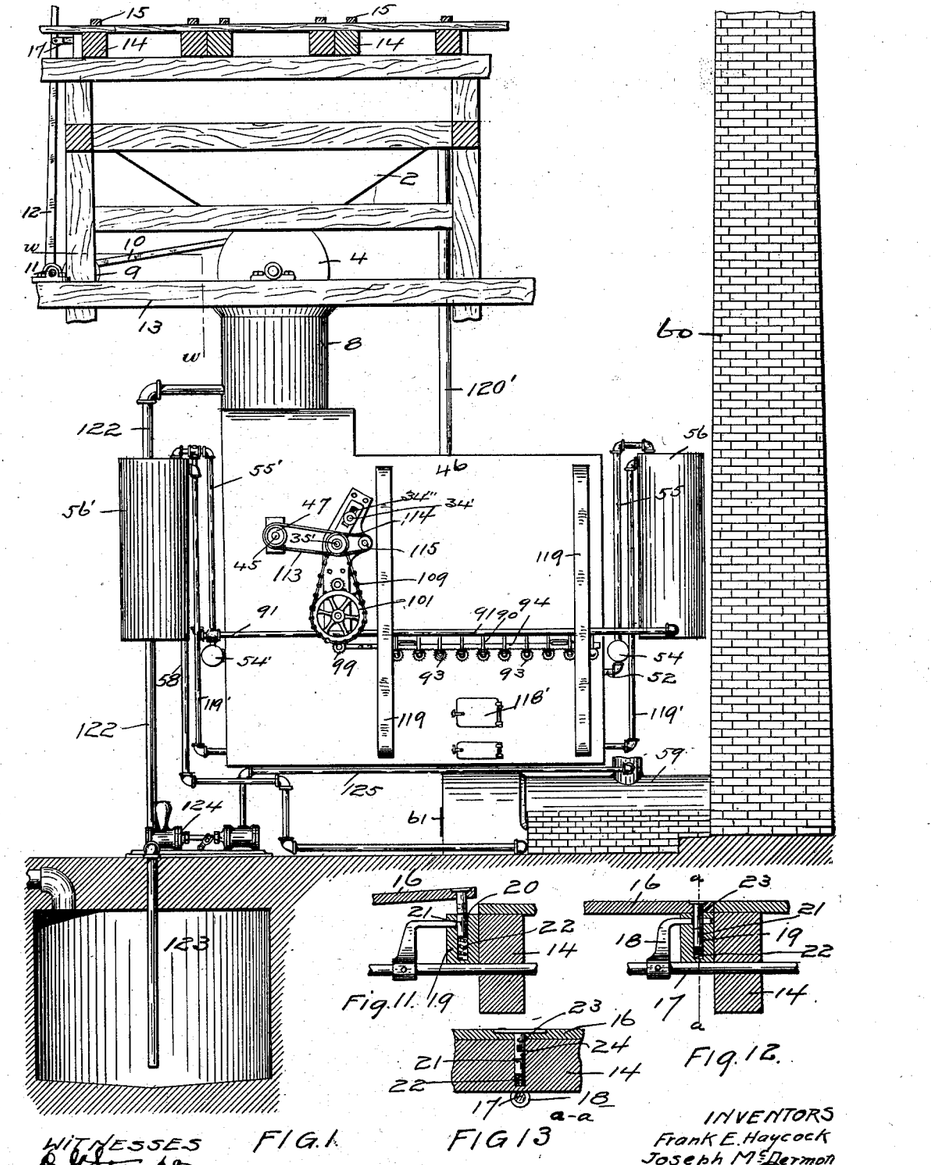
Figure 1 is a side elevation of a crematory embodying our invention.
Fig. 11 is a detail of the locking device for the cover or top of the feed-hopper in its unlocked position.
Fig. 12 is a similar view showing the device in its locked position.
Fig. 13 is a section on the line $a\ a$ of Fig. 12.

This apparatus may be used for destroying sewage matter, and in Fig. 1 we have shown means by which the material from a sewer can be lifted up to the funnel 8 and discharged therein. This means consists in a pipe 122, connected with a sewer-basin 123 and discharging at its upper end into the funnel 8, the material being lifted through the said pipe by means of a force-pump 124, steam therefor being supplied through a pipe 125, connected with the boiler. This adjunct of the crematory apparatus may of course be operated or not, as preferred, its use not in any way affecting the functions of the remainder of the apparatus.

We claim as our invention—

1. In a crematory, the combination, with a hopper, of an oscillating member having a series of curved teeth provided in the bottom thereof, a concave having a series of curved teeth arranged to coöperate with the teeth of said member, and means for oscillating said cylinder.

2. In a crematory, the combination, with a hopper, of an oscillating member provided in the bottom thereof and having a series of downwardly-turned teeth, and a concave also having a series of downwardly-curved teeth arranged to coöperate with said member, for the purpose specified.

3. In a crematory, the combination, with a hopper, of means provided in the bottom thereof for reducing the material to fragments of uniform size, means for operating said reducing means, a suitable cover for said hopper, and means controlled by the starting and stopping of said operating means for locking and unlocking said cover, substantially as described.

4. In a crematory, the combination, with a hopper, of means provided in the bottom thereof for reducing the material to fragments of uniform size, means for operating said reducing means, wagon-supporting timbers extending across said hopper, gates provided between said timbers and arranged to be opened to allow the discharge of material into said hopper, and means controlled by the starting of said operating means for locking the said gates, substantially as described.

5. In a crematory, the combination, with a hopper, of an oscillating toothed member provided in the bottom thereof, a concave having a series of teeth coöperating with the teeth of said member, a suitable cover for said hopper, and a friction-drive device arranged to simultaneously lock said cover and actuate said member, substantially as described.

6. In a crematory, the combination, with a suitable hopper, of means for reducing the material therein to fragments of uniform size, a perforate floor, a device having obliquely-arranged arms operating thereover, said arms having a series of teeth in their upper edges, for the purpose specified.

7. In a crematory, the combination, with a suitable hopper, of a perforate floor, a crushing and squeezing device arranged to revolve over said floor and having a series of obliquely-arranged arms, and said arms having a series of cutting edges in their lower sides, for the purpose specified.

8. In a crematory, the combination, with a funnel, of a perforate floor therein, a revolving device provided thereon and having a series of radiating arms, said arms being arranged obliquely with respect to the surface of said floor and having a series of teeth in their upper edges, for the purpose specified.

9. In a crematory, the combination, with a funnel, of a perforate floor therein, a revolving device arranged to sweep over the surface of said floor and provided with a series of arms arranged obliquely with respect to said floor, a series of teeth provided in the upper sides of said arms and a series of cutting edges in the lower sides of said arms, for the purpose specified.

10. In a crematory, the combination, with a drying-chamber, of means for extracting the liquids from the solid material before delivery of the latter to said chamber, and means operating to clean the surface of said liquid-extracting means and for spreading the material evenly over the floor of said chamber.

11. In a crematory, the combination, with a drying-chamber, of rolls arranged to extract the liquids from the solid material before delivery of the latter to said chamber, and a revolving brush provided in advance of and in contact with said rolls and arranged to receive the material therefrom and spread it evenly over the floor of said chamber.

12. In a crematory, the combination, with a drying-chamber, of a sliding grate provided in the bottom thereof, and liquid-extracting rolls through which the material passes prior to its discharge into said chamber.

13. In a crematory, the combination, with a drying-chamber, of a sliding grate provided in the bottom thereof, liquid-extracting rolls between which the material passes before its entrance into said chamber, and means for distributing the material from said rolls evenly over said grate.

14. In a crematory, the combination, with a fire-box and grate, of a series of flattened water-tubes swiveled in their supports and forming a close floor above said grate, and a fluid-circulating system connected with said tubes.

15. In a crematory, the combination, with an incinerating-chamber, of means for reducing the solid material to fragments of uniform size, pressure-rolls arranged to receive the crushed material from said reducing means, and a revolving brush arranged to distribute the material from said rolls uniformly within said chamber.

16. In a crematory, an incinerating-chamber provided with a fire-box and grate, a drying-chamber having a sliding grate in the upper part of said incinerating-chamber, a superheating-chamber arranged intermediate to said drying-chamber and said fire-box, and a water-grate separating said superheating-chamber from said fire-box.

17. In a crematory, an incinerating-chamber, comprising a fire-box having a suitable grate, in combination with a superheating-chamber arranged above the same, and a series of swiveled flattened water-tubes closing communication between said fire-box and said superheating-chamber, and a series of water-pipes extending through said fire-box and connected with said water-tubes.

18. In a crematory, the combination, with means for reducing the garbage material to fragments of uniform size, of means for extracting the liquid from the solid material, a drying-chamber whereto the solid material is delivered, a fire box and grate whereon the material is discharged from said chamber, a filtering apparatus arranged to receive the liquid extracted from said solid material, a condensing device, and a fluid-circulating system extending through said fire-box and connecting said filtering apparatus and said condenser.

19. In a crematory, the combination, with means for separating the liquids from the solids, of a fire-box and grate and a chamber provided above the same, oscillating water-tubes separating said fire-box from said chamber, a filtering apparatus, a condenser, and a fluid-circulating system extending through said fire-box and connecting said filtering apparatus and said condenser with said water-tubes.

20. In a crematory, an incinerating-chamber, comprising a fire-box and grate, a superheating-chamber arranged above the same, a series of oscillating water-tubes separating said fire-box and said superheating-chamber, a drying-chamber provided above said superheating-chamber, a sliding grate therefor, means for discharging the material to be destroyed upon said grate, and means for operating said grate and said water-tubes alternately, substantially as described.

21. In a crematory, an incinerating-chamber, comprising a fire-box and grate, a superheating-chamber provided above said fire-box, water-tubes separating said fire-box from said superheating-chamber, a drying-chamber, a grate separating said drying-chamber from said superheating-chamber, bars connected with said grate and with said water-tubes, multiple-crank shafts whereto said bars are connected, pinions provided on said shafts, and a mutilated gear interposed between said shafts and pinions and arranged to operate them alternately, substantially as described.

22. In a crematory, a closed incinerating-chamber having a fire-box and grate, a superheating-chamber above said fire-box, a series of water-tubes separating said fire-box and said chamber, a drying-chamber above said superheating-chamber, a sliding grate in the bottom of said drying-chamber and whereon the material is deposited preparatory to the burning operation, and flues leading from said drying-chamber to the bottom of said fire-box.

23. In a crematory, the combination, with an incinerating-chamber having a fire-box, of means for separating the liquids from the solids prior to the delivery of the latter to said chamber, a filtering apparatus whereto the liquid is delivered, a suitable condenser, fluid-circulating pipes leading from said filtering apparatus to said condenser, and a gas-conducting pipe leading from said condenser to the bottom of said fire-box.

24. The combination, with an incinerating-chamber, of means for separating the liquids from the solids prior to the delivery of the latter to said chamber, a filtering apparatus whereto the liquid is delivered, a suitable condenser, and fluid-circulating pipes leading from said filtering apparatus through said incinerating-chamber to said condenser.

25. In a crematory, an incinerating-chamber provided with a fire-box and grate, in combination with a flue arranged to project through and above said grate, and a fire-box and grate outside said chamber and communicating with the outer end of said flue.

26. In a crematory, an incinerating-chamber having a fire-box and grate, in combination with flues leading from the upper part of said chamber to the bottom of said fire-box, and a flue projecting through and above said grate, and a second fire-box and grate connected with the outer end of said flue, substantially as described.

27. In a crematory, an incinerating-chamber having closed walls and a fire-box and grate, of a flue extending through the bottom of said chamber and projecting through and above said grate, a boiler provided outside said chamber and having a grate and fire-box communicating with said flue, and a suitable stack connected with said boiler.

28. The combination, with a suitable boiler, of an incinerating-chamber having closed walls and provided with a suitable grate, of flues leading from the upper part of said chamber to a point beneath said grate, and a flue projecting through and above said grate and connecting with the fire-box of said boiler, for the purpose specified.

29. In a crematory, the combination, with means for squeezing and crushing the garbage material, of an inclined perforated floor beneath said crushing and squeezing means, liquid-extracting rolls arranged to receive the coarse material from said inclined floor, and a filtering-chamber provided beneath said floor, substantially as described.

30. In a crematory, a series of flattened oscillating water-tubes, in combination with a drying-chamber, a movable grate therein, and means for alternately operating said water-tubes and said movable grate.

31. In a crematory, the combination with an inclined perforated floor, of a filtering-chamber beneath the same, liquid-extracting rolls arranged to receive the material from said floor, a brush on the discharge side of said rolls and contacting therewith, and a drying-chamber whereto the material is delivered from said brush.

32. In a crematory, the combination, with a drying-chamber having a movable grate, of a superheating-chamber provided with a series of swiveled water-tubes, and means for alternately operating said grate and said tubes.

33. In a crematory, the combination, with a superheating-chamber, of a series of flattened water-tubes swiveled therein and arranged when in their normal position to form a close floor in the bottom of said chamber, and a fluid-circulating system connected with said tubes.

34. In a crematory, the combination, with a fire-box and grate, of a series of swiveled water-evaporating tubes provided above said grate, a filtering apparatus, steam-condensers, and a fluid-circulating system connecting said filtering apparatus and said condensers with said tubes.

35. In a crematory, the combination, with a fire-box and grate, of water-tubes provided above the same, a fluid-circulating system connected with said tubes, a filtering apparatus, and steam-condensers connected with said filtering apparatus and said fluid-circulating system.

36. In a crematory, the combination, with a fire-box and grate, of a superheating-chamber arranged above the same, and a series of flattened water-tubes separating said fire-box from said chamber and normally closing communication between the same, substantially as described.

37. In a crematory, the combination, with a fire-box and grate, of water-tubes provided above the same, a fluid-circulating system, a steam-condenser connected with said tubes, and a flue leading from the upper part of said condenser to said fire-box.

38. In a crematory, the combination, with a fire-box and grate, of a flue arranged to project up through said grate, a cap provided on said flue, and a second fire-box communicating with the outer end of said flue, for the purpose specified.

39. In a crematory, an incinerating-chamber, comprising a fire-box and grate, a superheating-chamber provided above said grate, a series of flattened water-tubes separating said superheating-chamber from said fire-box and forming a close floor between them, a drying-chamber above said superheating-chamber, and a movable grate separating said drying and superheating chambers, substantially as described.

In witness whereof we have hereunto set our hands this 11th day of April, 1903.

FRANK E. HAYCOCK.
JOSEPH McDERMOTT.

In presence of—
RICHARD PAUL,
S. V. GRIFFIN.